(12) United States Patent
Henderson et al.

(10) Patent No.: US 7,437,580 B2
(45) Date of Patent: Oct. 14, 2008

(54) DYNAMIC VOLTAGE SCALING SYSTEM

(75) Inventors: Eric L. Henderson, San Diego, CA (US); Michael Drop, San Diego, CA (US); Tauseef Kazi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 339 days.

(21) Appl. No.: 10/840,635

(22) Filed: May 5, 2004

(65) Prior Publication Data

US 2005/0251700 A1  Nov. 10, 2005

(51) Int. Cl.
*G06F 1/32* (2006.01)
(52) U.S. Cl. .................. 713/320; 713/300; 713/401
(58) Field of Classification Search .......... 713/300, 713/322, 323, 401, 503, 320; 327/326; 716/6; 710/118, 125
See application file for complete search history.

(56) References Cited

U.S. PATENT DOCUMENTS

| | | | | |
|---|---|---|---|---|
| 5,745,375 | A * | 4/1998 | Reinhardt et al. | 700/286 |
| 5,781,784 | A * | 7/1998 | McKinley | 713/320 |
| 6,157,247 | A | 12/2000 | Abdesselem et al. | |
| 6,601,177 | B1 * | 7/2003 | Fujigaya et al. | 713/300 |
| 6,657,467 | B2 * | 12/2003 | Seki et al. | 327/158 |
| 6,657,634 | B1 * | 12/2003 | Sinclair et al. | 345/534 |
| 6,927,605 | B2 * | 8/2005 | Fetzer et al. | 327/101 |
| 6,985,025 | B1 * | 1/2006 | Maksimovic et al. | 327/540 |
| 7,032,117 | B2 * | 4/2006 | Kolinummi et al. | 713/300 |
| 7,061,292 | B2 * | 6/2006 | Maksimovic et al. | 327/277 |
| 7,117,378 | B1 * | 10/2006 | Maksimovic et al. | 713/300 |
| 7,120,804 | B2 * | 10/2006 | Tschanz et al. | 713/300 |
| 7,148,755 | B2 * | 12/2006 | Naffziger et al. | 331/16 |
| 7,265,590 | B2 * | 9/2007 | Seki et al. | 327/20 |
| 2004/0049703 | A1 * | 3/2004 | Maksimovic et al. | 713/300 |
| 2005/0132238 | A1 * | 6/2005 | Nanja | 713/300 |

OTHER PUBLICATIONS

Burd, T., et al. Design Issues for Dynamic Voltage Scaling. Berkeley Wireless Research Center, University of California Berkeley, pp. 9-14, ISPLD, Aug. 2000.

Burd, T., et al. A Dynamic Voltage Scaled Microprocessor System. IEEE Journal of Solid-State Circuits, Nov. 2000, pp. 1571-1580, vol. 35, No. 11.

Dancy, A., et al. A Reconfigurable Dual Output Low Power Digital PWM Power Converter. Department of EECS, Massachusetts Institute of Technology, Cambridge, pp. 191-196, ISLPED 1998.

(Continued)

*Primary Examiner*—Nitin C Patel
(74) *Attorney, Agent, or Firm*—Krong H. Macek; Jonathan T. Velasco; Thomas R. Rouse

(57) ABSTRACT

Methods and apparatus for implementing a Dynamic Voltage Scaling (DVS) system are presented herein. In one embodiment, an embedded delay checker (EDC) cell is used to measure the actual activity and delay of a critical path within a microprocessor core, which is the basis for dynamically altering the voltage to the core. In another embodiment, a slaved ring oscillator (SRO) cell is placed adjacent to the microprocessor core and is used along with EDC cells to provide redundancy to a DVS system.

42 Claims, 5 Drawing Sheets

OTHER PUBLICATIONS

Dancy, A., et al. Techniques for Aggressive Supply Voltage Scaling and Efficient Regulation. IEEE 1997 Custom Integrated Circuits Conference. pp. 579-586.

Kim, J., et al. An Efficient Digital Sliding Controller for Adaptive Power-Supply Regulation. IEEE Journal of Solid-State CIrcuits, May 2002, pp. 639-647, vol. 37, No. 5.

Kuroda, T., et al. Variable Supply-Voltage Scheme for Low-Power High-Speed CMOS Digital Design. IEEE Journal of Solid-State Circuits, Mar. 1998, vol. 33, No. 3.

Wei, G., et al. A Fully Digital, Energy-Efficient, Adaptive Power-Supply Regulator. IEEE Journal of Solid-State Circuits, Apr. 1999, vol. 34, No. 4.

Burd, T., et al. Design Issues for Dynamic Voltage Scaling. Berkeley Wireless Research Center, University of California Berkeley, pp. 9-14.

Dancy, A., et al. A Reconfigurable Dual Output Low Power Digital PWM Power Converter. Department of EECS, Massachusetts Institute of Technology, Cambridge, pp. 191-196.

* cited by examiner

DYNAMIC VOLTAGE SCALING SYSTEM

BACKGROUND

1. Field

The present invention relates generally to the field of power, and. more specifically, to the field of minimizing power consumption of electronic components.

2. Background

Minimizing the draw from an internal power source permits electronic devices such as, for example, personal digital assistants (PDAs), mobile telephony devices, personal laptop computers, etc., to operate for extended time periods untethered to an external power source. One methodology for reducing power consumption is based on the premise that the microprocessor cores within such devices need not operate at peak performance levels at all times. If a lower level of performance is allowed, then the clock frequency of a microprocessor core may be lowered. Correspondingly, the minimum supply voltage to the core for supporting that clock frequency may also be lowered. Hence, dynamic voltage scaling (DVS) is a methodology designed to adjust the voltage supplied to a microprocessor core whenever the computational load upon the core changes.

Some past DVS systems were based on duplication of a critical path of the core. In digital signal processing systems, the term "critical path" refers to the longest path between any two storage elements or any two delay elements. In combinational logic circuits, the critical path is the greatest delay path between inputs and outputs.

In one example of a past DVS system, a free-running ring oscillator configured in a feedback loop is used to model the critical path. The supply voltage is fed to the free-running ring oscillator, which outputs a clock signal that may easily be converted into an operating frequency. The operating frequency may be compared to a desired frequency to generate an error value. The error value may then be used to determine the transfer of charge to a capacitor, which is used to generate a new supply voltage. The new supply voltage may be fed back to the free-running ring oscillator to close the loop. Hence, the supply voltage may be adjusted whenever a new clock frequency is requested. Alternative components, such as linear regulators and buck converters, may be used in conjunction with the free-running ring oscillator to achieve the desired results.

However, the DVS systems described above are not optimal since they depend on the measurements of a critical path model, not the measurements of the actual critical path itself.

SUMMARY

Methods and apparatus are presented herein to address the needs stated above. The new DVS system presented herein increases the accuracy of the supply voltage adjustments by taking raw data measurements of a critical path, rather than taking measurements of a duplication model. In one aspect, a dynamic voltage scaling system is presented, comprising: a monitoring block for sensing activity information and critical path delay information occurring within a microprocessor core; and a control block for reading the activity information and the critical path delay information from the monitoring block, processing the activity information and the critical path delay information, and adjusting voltage that is supplied to the microprocessor core according to the results of processing the activity information and the critical path delay information.

In another aspect, an embedded delay checker (EDC) cell configured to receive a terminal register input signal, a terminal register output signal and a control signal is presented, the EDC cell comprising: a plurality of delay elements; a multiplexer coupled to the plurality of delay elements, wherein the multiplexer is configured to select a subset of delay elements to place in the path of the terminal register input signal in accordance with the control value; a register for storing a output of the multiplexer; and a logical element configured to detect a logical difference between the stored output of the multiplexer with the terminal register output signal.

In another aspect, a method for dynamically scaling the voltage of a processing core is presented, the method comprising: directly sensing activity within the processing core; determining delay information associated with a critical path of the processing core; and using the sensed activity and the delay information to scale the voltage of the processing core.

In another aspect, apparatus for dynamically scaling the voltage of a processing core is presented, the apparatus comprising: means for directly sensing activity within the processing core; means for determining delay information associated with a critical path of the processing core; and means for using the sensed activity and the delay information to scale the voltage of the processing core.

DETAILED DESCRIPTION

Various methods and apparatus for implementing a Dynamic Voltage Scaling (DVS) system are presented herein. In one embodiment, an embedded delay checker (EDC) cell is used to measure the actual activity and delay of a critical path within a microprocessor core, which is the basis for dynamically altering the voltage to the core. In another embodiment, a slaved ring oscillator (SRO) cell is placed adjacent to the microprocessor core and is used along with EDC cells to provide redundancy to a DVS system.

Figure 1:
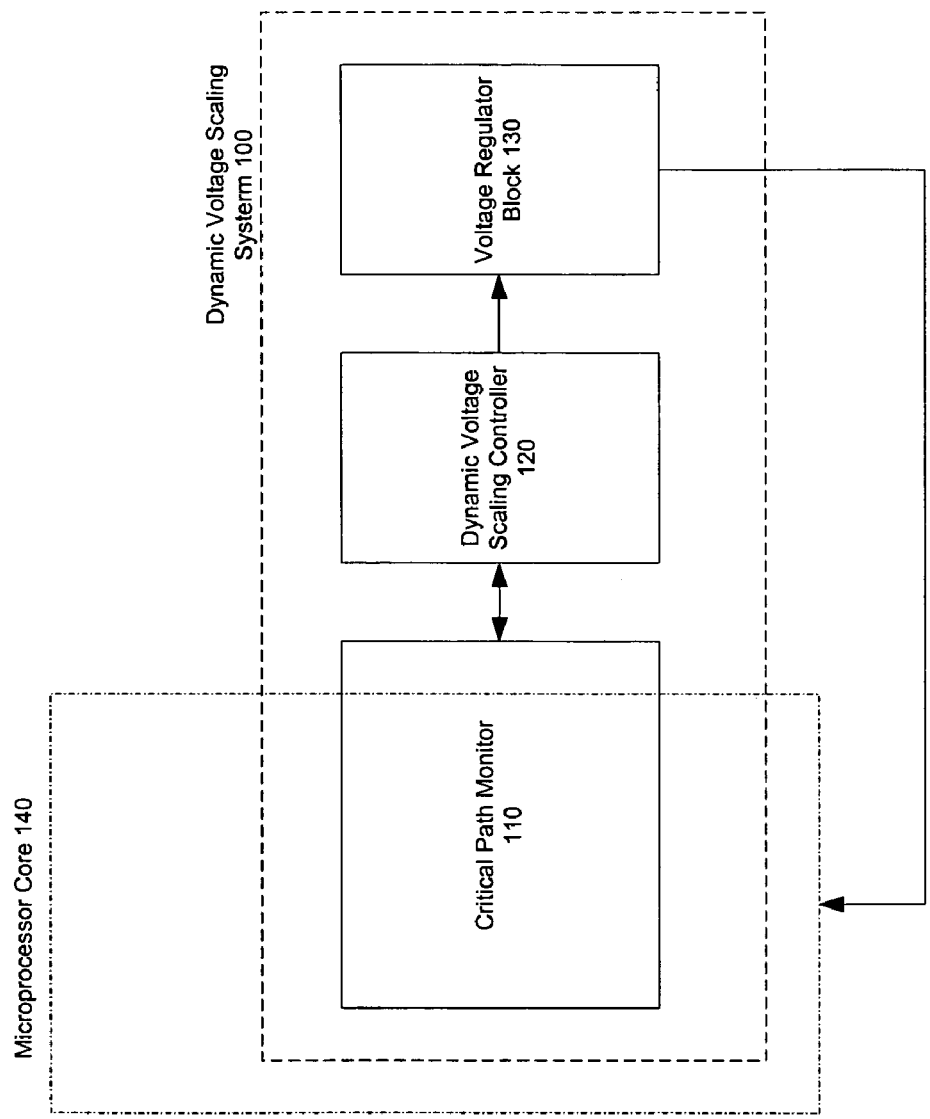
FIG. 1 is a block diagram of a Dynamic Voltage Scaling (DVS) system using embedded delay check (EDC) cells and slaved-ring oscillator (SRO) cells.

FIG. 1 is a functional block diagram of an embodiment of a DVS system that may use EDC cells and SRO cells. The DVS system 100 comprises a Critical Path Monitor (CPM) block 110, a Dynamic Voltage Scaling Controller (DVSC) block 120, and a voltage regulator block 130. The CPM block 110 is for capturing and processing the activity within a microprocessor core 140. The DVSC block 120 is for reading and processing the output of the CPM 110 and adjusting the voltage to the core. The DVSC block 120 may also be for sensing the parameters within the CPM components and for adjusting the parameters accordingly, in order to create hysteresis within the system. The voltage regulator block 130 is for supplying voltage to the core in incremental steps, according to the direction from the DVSC block 120.

Figure 2:
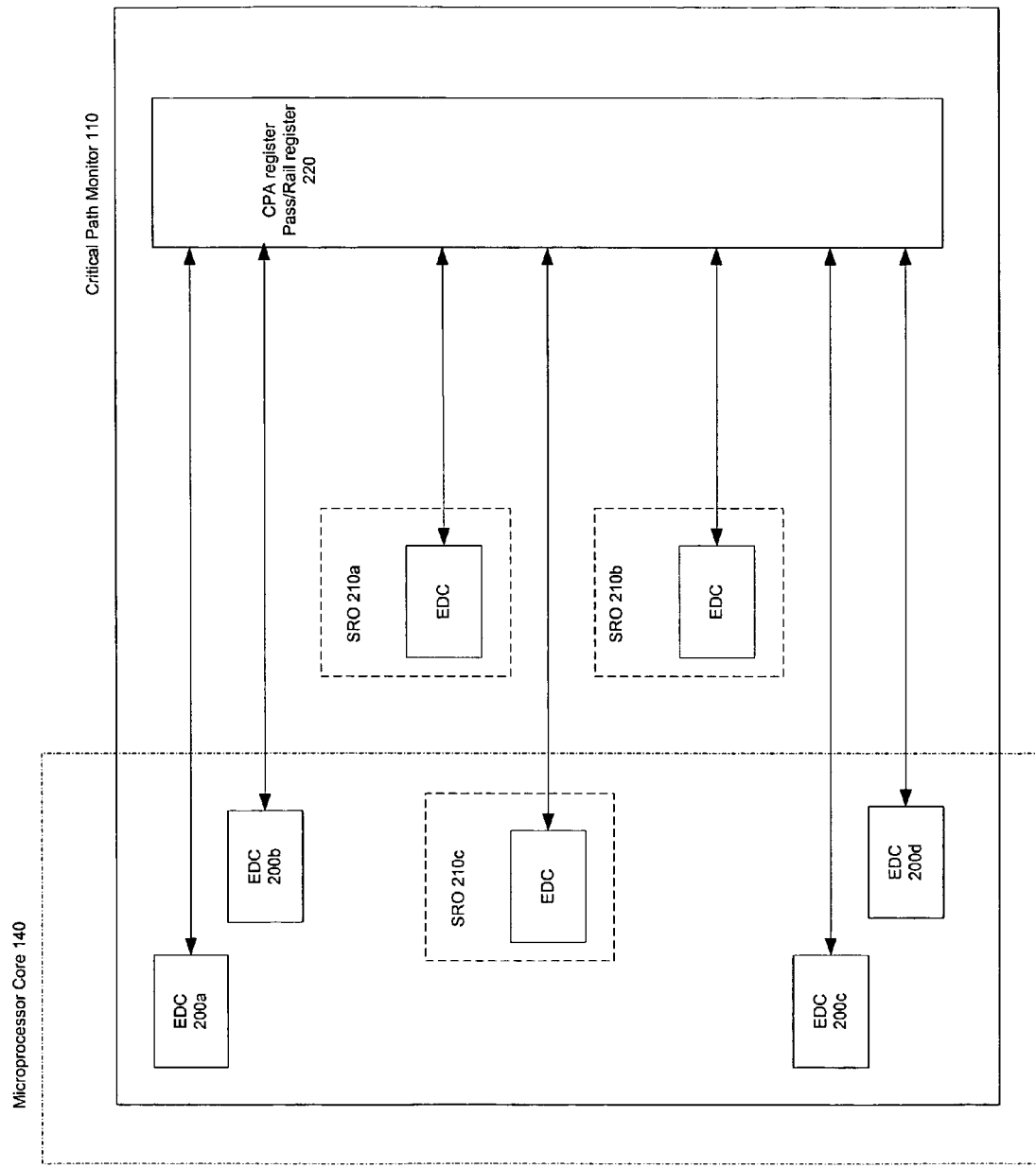
FIG. 2 is a block diagram of a Critical Path Monitor (CPM) block.

FIG. 2 is a block diagram of the CPM block 110 that includes the EDC cells 200a-200d located within a microprocessor core 140, SRO cells 210a, 210b located adjacent to the microprocessor core, SRO cell 210c located within the core 140, a Critical Path Activity (CPA) register 220 and a Pass/Fail register 220. For the purpose of illustrative ease, only four (4) EDC cells, three (3) SRO cells, and one (1) combined CPA & Pass/Fail register are described in this CPM block illustration. One of skill in the art would understand that variable numbers of such cells may be implemented without undue experimentation.

In general, the EDC cell 200 is for directly sensing the activity and the delays of the critical path within a microprocessor core. The activity information is used by the DVS system 100 in order to qualify the delay information, which is used in turn to determine whether to raise or lower the supply voltage to the core. The EDC cell 200 is positioned to receive the input signal that enters a terminal register of a critical path and also to receive the output signal that exits the terminal register. A "terminal register" is the termination point of a signal path relative to the core clock. For optimal performance, the EDC cell 200 should be positioned near the critical path region in order to minimize routing delays. Alternatively, the EDC cell 200 may be designed to compensate for routing delays if the EDC cell 200 is positioned away from the critical path region. The CPA register 220 determines activity on the critical path by comparing the previous logical state of the path to the current logical state of the path. As used herein, "activity" is a logical change from 1 to 0 or from 0 to 1.

Figure 3:
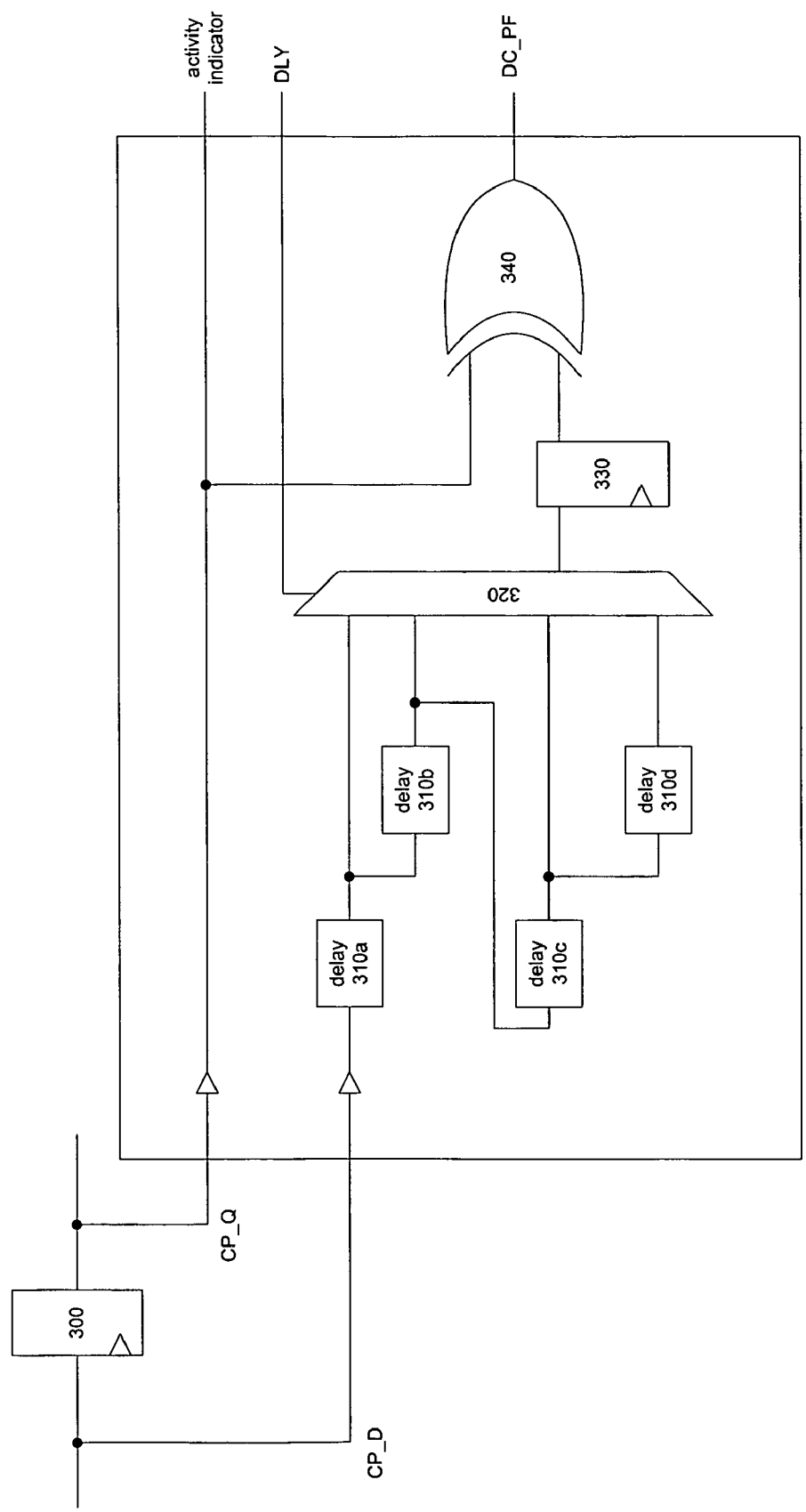
FIG. 3 is a block diagram of a possible structure for an EDC cell.

FIG. 3 is a block diagram of the internal structure of an EDC cell 200. Various delay elements 310a-310d are selectively added to the path of signal CP_D, which is also the input signal that enters a terminal register 300. The number of delay elements placed in the path of signal CP_D is adjusted by control signal DLY. Control signal DLY originates from the DVSC block 120 (not shown). Control signal DLY is received at a multiplexer 320, which is configured to select the various delay elements 310a-310d that will be in the path of the signal CP_D. The output of the multiplexer 320 is stored in an EDC register 330. A XOR gate 340 may be used to determine the logical difference between the contents of the EDC register 330 and the contents of the terminal register 300. The contents of the terminal register 300 are carried by signal CP_Q. Hence, the pass/fail bit DC_PF output by the XOR gate 340 is active only when a logical difference exists between the output CP_Q of the terminal register 300 and the output of the EDC register 330.

The signals CP_Q and DC_PF are carried outside the EDC cell 200 to the DVSC block (not shown), which interprets the information contained within these signals to control the voltage supplied to the core and to control the parameters within the EDC cell 200.

There is an implied functionality of the EDC cell that is inherent in the above description. The function is that of a canary in a coal mine. The EDC cells may be designed to ensure that the total delay within each EDC cell is larger than the critical path monitored by each EDC cell. Hence, if the voltage to the core is lowered too far, the EDC will fail first before the minimum operating voltage of the critical path is reached, i.e., the pass/fail bit DC_PF will change before the minimum operating voltage of the critical path region is reached.

Controlling Delays within an EDC Cell

In one aspect of the embodiments, the DVSC block increases or decreases the delay within the EDC cell according to boundary regions for system hysteresis. The general idea is that the amount of delay within the EDC cell is adjusted to elicit a specific response from the DC_PF bit after circuit activity occurs. Circuit activity is indicated by a comparison between a previous logical state and a current logical state, as indicated by a stored CP_Q bit and the current CP_Q bit. Because of the variable nature of the EDC cell, the system may adjust the number of delay elements within the EDC cell during the course of normal operations in order to elicit a specific response from the DC_PF bit. Hence, the number of delay elements may be adjusted up or down by the DVSC in order to determine the operational thresholds for each sensed critical path. A hysteresis chart, such as presented as an example in FIG. 4, can then be formed and used to determine whether to raise or lower the voltage supplied to the core whenever events occur within different boundary regions.

Figure 4A:
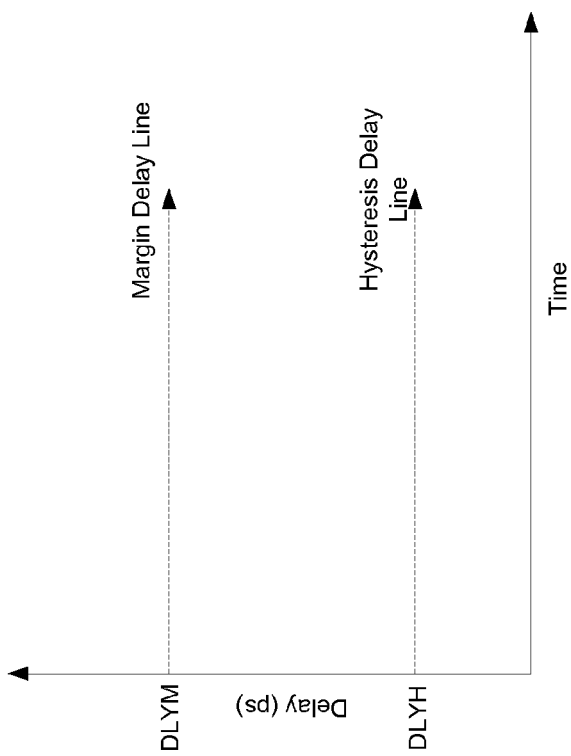
FIG. 4A is an example of a hysteresis chart used by a Dynamic Voltage Scaling Controller (DVSC) block to adjust voltage supplied to a core.
Figure 4B:
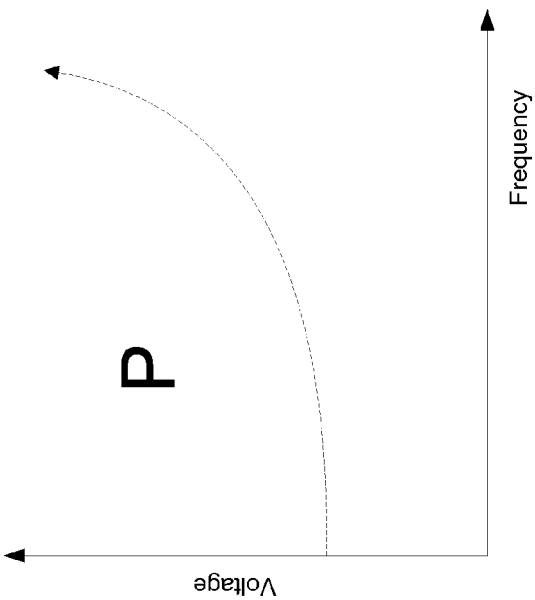
FIG. 4B is a plot of voltage versus frequency, wherein a threshold curve represents the minimum supply voltage at which a processing core can operate at a given frequency.

FIG. 4 plots critical path circuit delay over time for different voltages. Threshold values DLYM and DLYH represent the values assigned to the DLY input to the EDC cell and are dynamically changed in response to the changing conditions within the core. The DLYM threshold value, also referred to as the margin delay line, represents the margin which the system imposes to force the EDC cell to fail before the measured critical path. The DLYH threshold value, also referred to as the hysteresis delay line, represents the lower range at which the amount of delay may fluctuate without affecting the core supply voltage.

The determination that the added delay was too high or too low may be used by the system to determine whether to increase or decrease the voltage. In the region above the DLYM threshold value, the voltage to the core must be raised. In the regions between the DLYM threshold value and the DLYH threshold value, the voltage is allowed to remain unchanged. In the region below the DLYH threshold value, the voltage may be lowered.

In another aspect of the above embodiment, the DVSC block increases or decreases the voltage supplied to the microprocessor core according to the presence of a logical difference between the CP_Q bit and the output of the EDC register. The DC_PF bit goes active when a logical difference exists between the CP_Q bit and the output of the EDC register. Note that the embodiment of FIG. 3 was illustrated with a XOR gate for determining the presence of a logical difference, but other logic may be used for the same purpose without undue experimentation.

If the DC_PF bit goes active during the course of circuit activity and the number of added delays approaches the margin delay line, then the DVSC block may interpret these conditions as meaning that the voltage supplied to the core should be raised. Conversely, if the DC_PF bit remains inactive during the course of circuit activity and the number of added delays approaches the hysteresis delay line, then the DVSC block may interpret these conditions as meaning that the voltage supplied to the core should be lowered.

Hence, the direct measurement of microprocessor core activity and the examination of delays in the EDC cells may be used to dynamically adjust the voltage supplied to the core.

Granularity

In another aspect of the embodiments, the EDC cell may be designed with numerous delays of differing sizes in order to increase the sensitivity range of the EDC cell. For example, if the value T is the delay of the most critical path of a core, and the most critical path delay of a core determines the maximum operating frequency of the core, then each individual delay element within the EDC core may be selected as a percentage of the value T in order to produce a desired granularity. For example, each delay element may comprise a delay size that is 5% of T for finer granularity, or each delay element may comprise a delay size that is 10% of T for coarser granularity. In another example, each delay element may comprise a differing delay size within each EDC cell.

The delay sizes may be set according to system constraints or preferences. One system constraint is that the supply voltage to the core never dips below a pre-determined threshold curve on a plot of voltage versus frequency. Such a curve is typically referred to as a shmoo plot. In the shmoo plot illustrated in FIG. 4B, the threshold curve shows the minimum supply voltage at which the core can operate at a given frequency. The region containing the letter designation "P" indicates the pass region, wherein the supply voltage may be altered without fear of failure. The region without the letter designation "P" indicates the fail region, wherein the microprocessor core will not operate properly.

In relation to EDC cells, the threshold voltage levels should comprise the desired operational voltage and a pre-determined amount of margin for error. As used herein, the desired operational voltage is the lowest possible voltage that may be supplied to the core without causing failure on the most critical path.

Redundancy within the DVS System

Note that the EDC cell is operational when there is activity in the core, but that the EDC cell is not operational when there is no activity in the core. Hence, in addition to, or in place of, the EDC cell, a slaved ring oscillator (SRO) cell may also be used by a DVS system to adjust the supply voltage. As discussed above, other DVS systems use free-running ring oscillators in a feedback loop in order to convert voltage into operating frequency. Hence, free-running ring oscillators are used in the prior art to replicate the voltage of the critical path region. The ring oscillators described herein are used for replicating the clock speed of a critical path region, which is then used to adjust the supply voltage during periods of inactivity within the microprocessor core.

Figure 5:
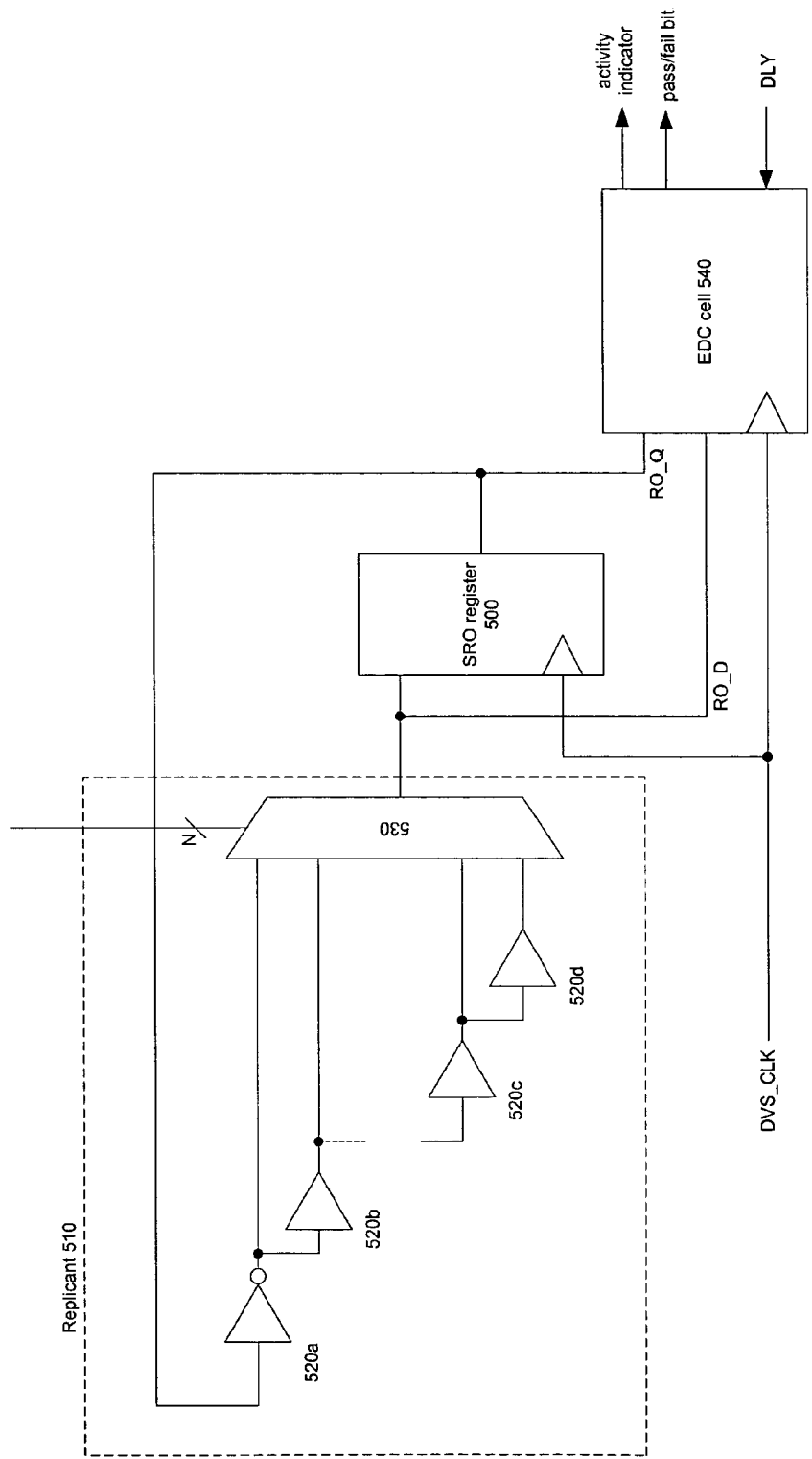
FIG. 5 is a block diagram of a possible structure for an SRO cell.

FIG. 5 is a block diagram of an SRO cell 210. The SRO cell receives a clock signal DVS_CLK, which is input to a SRO register 500 along with the output of a replicant 510 of the critical path. The replicant 510 comprise delay elements 520a-520d coupled to a multiplexer 530. The output of the multiplexer 530 is the input to the SRO register 500 from the replicant 510. The output of the multiplexer 530 is also input to an EDC cell 540. The output of the SRO register 500 is coupled to a self-inverting delay element 520a and the EDC cell 540. A control line from the DVSC block (not shown) is input to the multiplexer 530 and is used for adjusting the number of delay elements for a given operation. For illustrative ease, the output of the multiplexer 530 is referred to as RO_D and the output of the SRO register 500 is referred to as RO_Q. Note that the path from the SRO register 500 to the delay elements 520a-520d to the multiplexer 530 and back to the SRO register 500 creates a ring oscillator configuration.

However, the ring oscillator configuration described above in FIG. 5 is coupled to the SRO register so that there is no free oscillation. The ring oscillator is "slaved" to the clock signal DVS_CLK, which is provided to the register. Since there is a self-inverting delay element in the ring oscillator, an alternating value should be received at the SRO register at every clock cycle. If the values do not alternate, then the clock signal DVS_CLK is running faster than the open loop response RO_D of the ring oscillator. Since the ring oscillator is a replicant of a critical path, non-alternating values indicate that the supply voltage should be lowered.

In one embodiment, the EDC cells are placed strategically throughout the microprocessor core. The SRO cells may be placed adjacent to the microprocessor core in order to determine how thermal characteristics of the core affect the performance of the circuit path delay. The SRO cells may also be placed within the microprocessor core. Since the EDC cell operates only when there is activity within the core, the SRO cell may be used as a redundant system whenever the core is inactive. In this manner, the DVSC may control voltage to the core even when the core is inactive.

The various illustrative logical blocks, modules, and circuits described in connection with the microprocessor embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim:

1. A dynamic voltage scaling system, comprising:
    a monitoring block for sensing activity information and critical path delay information occurring within a microprocessor core;
    a control block for reading the activity information and the critical path delay information from the monitoring block, processing the activity information and the critical path delay information, and adjusting voltage that is supplied to the microprocessor core according to the results of processing the activity information and the critical path delay information; and
    wherein the monitoring block comprises at least one embedded delay checker (EDC) cell configured to receive a terminal register input signal, a terminal register output signal and a control signal, the EDC cell comprising:
- a plurality of delay elements;
- a multiplexer coupled to the plurality of delay elements, wherein the multiplexer is configured to select a subset of delay elements to place in the path of the terminal register input signal in accordance with the control signal;
- a register for storing an output of the multiplexer; and
- a logical element configured to detect a logical difference between the stored output of the multiplexer and the terminal register output signal.

2. The dynamic voltage scaling system of claim 1, wherein the monitoring block further comprises at least one register for storing an output of the at least one EDC cell.

3. The dynamic voltage scaling system of claim 2, wherein the monitoring block further comprises at least one slaved ring oscillator (SRO) cell.

4. The dynamic voltage scaling system of claim 3, wherein the SRO cell comprises:
- a self-inverting delay element;
- at least one non-inverting delay element, wherein each of the at least one non-inverting delay element is configured to receive an output of another one delay element;
- a multiplexer coupled to the output of each of the delay elements; and
- a register configured to receive the output of the multiplexer and a clock signal, wherein the output of the register is input to the self-inverting delay element.

5. The dynamic voltage scaling system of claim 1, wherein said monitoring block directly senses the activity information and directly senses the critical path delay information.

6. The system of claim 1, wherein a total delay corresponding to the EDC cell is larger than the critical path such that the EDC cell will fail before a minimum operating voltage of the critical path is reached.

7. The system of claim 1, wherein the control block is further operable to scale the voltage of the processing core according to boundary regions for system hysteresis.

8. The system of claim 7, wherein the boundary regions for system hysteresis comprise an upper margin delay line and a lower hysteresis delay line on a plot of critical path circuit delay over time for different voltages, and wherein the control signal is operable to adjust the voltage based on the upper margin delay line and the lower hysteresis delay line.

9. The system of claim 8, wherein the control signal is operable to raise the voltage to the processing core if the an added delay corresponding to the output of the multiplexer corresponds to a region above the margin delay line, and wherein the control signal is operable to lower the voltage to the processing core if the added delay corresponds to a region below the hysteresis delay line.

10. An embedded delay checker (EDC) cell configured to receive a terminal register input signal, a terminal register output signal and a control signal, the EDC cell comprising:
- a plurality of delay elements;
- a multiplexer coupled to the plurality of delay elements, wherein the multiplexer is configured to select a subset of delay elements to place in the path of the terminal register input signal in accordance with the control value;
- a register for storing a output of the multiplexer; and
- a logical element configured to detect a logical difference between the stored output of the multiplexer with the terminal register output signal.

11. The EDC cell of claim 10, wherein a total delay corresponding to the EDC cell is larger than the critical path such that the EDC cell will fail before a minimum operating voltage of the critical path is reached.

12. The EDC cell of claim 10, wherein the control block is further operable to scale the voltage of the processing core according to boundary regions for system hysteresis.

13. The EDC cell of claim 12, wherein the boundary regions for system hysteresis comprise an upper margin delay line and a lower hysteresis delay line on a plot of critical path circuit delay over time for different voltages, and wherein the control signal is operable to adjust the voltage based on the upper margin delay line and the lower hysteresis delay line.

14. The EDC cell of claim 13, wherein the control signal is operable to raise the voltage to the processing core if the an added delay corresponding to the output of the multiplexer corresponds to a region above the margin delay line, and wherein the control signal is operable to lower the voltage to the processing core if the added delay corresponds to a region below the hysteresis delay line.

15. A method for dynamically scaling the voltage of a processing core, comprising:
- directly sensing activity within the processing core;
- determining delay information associated with a critical path of the processing core;
- using the sensed activity and the delay information to scale the voltage of the processing core; and
- wherein the using action further comprises adjusting one or more of a plurality of delay elements within an embedded delay checker monitoring the critical path to control the voltage supplied to the processing core, wherein the plurality of delay elements in the embedded delay checker are configurable to propagate a delay that is larger than a delay of the critical path.

16. The method of claim 15 further comprising:
- adjusting the delay information associated with the critical path; and
- using the adjusted delay information along with the sensed activity and an original delay information to scale the voltage of the processing core.

17. The method of claim 15, wherein the adjusting further comprises causing the embedded delay component to fail before a minimum operating voltage of the critical path is reached.

18. The method of claim 15, wherein the using action further comprises scaling the voltage of the processing core according to boundary regions for system hysteresis.

19. The method of claim 18, wherein the boundary regions for system hysteresis comprise an upper margin delay line and a lower hysteresis delay line on a plot of critical path circuit delay over time for different voltages, and further comprising determining how to adjust the voltage based on the upper margin delay line and the lower hysteresis delay line.

20. The method of claim 19, further comprising:
- raising the voltage to the processing core if the determining indicates that an added delay corresponds to a region above the margin delay line; or
- lowering the voltage to the processing core if the determining indicates that the added delay corresponds to a region below the hysteresis delay line.

21. Apparatus for dynamically scaling the voltage of a processing core, comprising:
- means for directly sensing activity within the processing core;
- means for determining delay information associated with a critical path of the processing core;

means for using the sensed activity and the delay information to scale the voltage of the processing core; and wherein the means for using further comprises means for adjusting one or more of a plurality of delay elements within an embedded delay checker monitoring the critical path to control the voltage supplied to the processing core, wherein the plurality of delay elements in the embedded delay checker are configurable to propagate a delay that is larger than a delay of the critical path.

22. The apparatus of claim 21, further comprising:

means for adjusting the delay information associated with the critical path; and means for using the adjusted delay information along with the sensed activity and an original delay information to scale the voltage of the processing core.

23. The apparatus of claim 21, wherein the means for adjusting is further operable to cause the embedded delay component to fail before a minimum operating voltage of the critical path is reached.

24. The apparatus of claim 21, wherein the means for using is further operable to scale the voltage of the processing core according to boundary regions for system hysteresis.

25. The apparatus of claim 24, wherein the boundary regions for system hysteresis comprise an upper margin delay line and a lower hysteresis delay line on a plot of critical path circuit delay over time for different voltages, and further comprising means for determining how to adjust the voltage based on the upper margin delay line and the lower hysteresis delay line.

26. The apparatus of claim 25, wherein the means for using is further operable to raise the voltage to the processing core if the means for determining indicates that an added delay corresponds to a region above the margin delay line, or wherein the means for using is further operable to lower the voltage to the processing core if the means for determining indicates that the added delay corresponds to a region below the hysteresis delay line.

27. A dynamic voltage scaling system, comprising:

an embedded delay checker (EDC) cell to directly sense an input signal and to directly sense and output signal along a critical path within a microprocessor core, and to output responsive activity information and delay information;

a control block to adjust a voltage that is supplied to the microprocessor core according to the activity information and the delay information; and wherein the EDC cell comprises:
a plurality of delay elements;
a multiplexer coupled to the plurality of delay elements, wherein the multiplexer is configured to select a subset of the delay elements in accordance with a control value received from said control block;
a register for storing an output of the multiplexer; and
a logical element configured to detect a logical difference between the stored output of the multiplexer and the terminal register output signal.

28. The dynamic voltage scaling system according to claim 27, comprising:

a plurality of additional EDC cells to directly sense corresponding input and output signals along the critical path, and to output corresponding activity information and delay information, wherein said control block adjusts the voltage that is supplied to the microprocessor core according to the corresponding activity information and the corresponding delay information.

29. The dynamic voltage scaling system according to claim 27, wherein the delay information output by said EDC cell is larger than a delay of the critical path.

30. The dynamic voltage scaling system of claim 27, further comprising:

at least one slaved ring oscillator (SRO) cell to replicate a delay associated with the critical path and to provide redundant delay information to said control block.

31. The dynamic voltage scaling system of claim 30, wherein the SRO cell comprises:
a self-inverting delay element;
at least one non-inverting delay element, wherein each of the at least one non-inverting delay element is configured to receive an output of another delay element;
a multiplexer coupled to the output of each of the delay elements; and
a register configured to receive the output of the multiplexer and a clock signal, wherein the output of the register is input to the self-inverting delay element.

32. A dynamic voltage scaling system comprising:

an embedded delay checker (EDC) cell to directly sense an input signal and to directly sense and output signal along a critical path within a microprocessor core, and to output responsive activity information and delay information;

a control block to adjust a voltage that is supplied to the microprocessor core according to the activity information and the delay information; and wherein the EDC cell comprises:
a plurality of delay elements;
a multiplexer coupled to the plurality of delay elements, wherein the multiplexer is configured to select a subset of the delay elements in accordance with a control value received from said control block;
a register for storing an output of the multiplexer;
a logical element configured to detect a logical difference between the stored output of the multiplexer and the terminal register output signal; and
wherein the plurality of delay elements in said EDC cell are configured to propagate a delay that is larger than a delay of the critical path.

33. A dynamic voltage scaling system, comprising:

a monitoring block for sensing activity information and critical path delay information occurring within a microprocessor core;

a control block for reading the activity information and the critical path delay information from the monitoring block, processing the activity information and the critical path delay information, and adjusting voltage that is supplied to the microprocessor core according to the results of processing the activity information and the critical path delay information;

wherein the monitoring block comprises at least one embedded delay checker (EDC) cell;

wherein the monitoring block further comprises at least one register for storing an output of the at least one EDC cell;

wherein the monitoring block further comprises at least one slaved ring oscillator (SRO) cell, wherein the SRO cell comprises:
a self-inverting delay element;
at least one non-inverting delay element, wherein each of the at least one non-inverting delay element is configured to receive an output of another one delay element;
a multiplexer coupled to the output of each of the delay elements; and a register configured to receive the output of the multiplexer and a clock signal, wherein the output of the register is input to the self-inverting delay element.

34. The system of claim 33, wherein a total delay corresponding to the EDC cell is larger than the critical path such that the EDC cell will fail before a minimum operating voltage of the critical path is reached.

35. The system of claim 33, wherein the control block is further operable to scale the voltage of the processing core according to boundary regions for system hysteresis.

36. The system of claim 35, wherein the boundary regions for system hysteresis comprise an upper margin delay line and a lower hysteresis delay line on a plot of critical path circuit delay over time for different voltages, and wherein the control signal is operable to adjust the voltage based on the upper margin delay line and the lower hysteresis delay line.

37. The system of claim 36, wherein the control signal is operable to raise the voltage to the processing core if the an added delay corresponding to the output of the multiplexer corresponds to a region above the margin delay line, and wherein the control signal is operable to lower the voltage to the processing core if the added delay corresponds to a region below the hysteresis delay line.

38. A dynamic voltage scaling system, comprising:
an embedded delay checker (EDC) cell to directly sense an input signal and to directly sense and output signal along a critical path within a microprocessor core, and to output responsive activity information and delay information;
a control block to adjust a voltage that is supplied to the microprocessor core according to the activity information and the delay information; and
at least one slaved ring oscillator (SRO) cell to replicate a delay associated with the critical path and to provide redundant delay information to said control block, wherein the SRO cell comprises:
a self-inverting delay element;
at least one non-inverting delay element, wherein each of the at least one non-inverting delay element is configured to receive an output of another delay element;
a multiplexer coupled to the output of each of the delay elements; and
a register configured to receive the output of the multiplexer and a clock signal, wherein the output of the register is input to the self-inverting delay element.

39. The system of claim 38, wherein a total delay corresponding to the EDC cell is larger than the critical path such that the EDC cell will fail before a minimum operating voltage of the critical path is reached.

40. The system of claim 38, wherein the control block is further operable to scale the voltage of the processing core according to boundary regions for system hysteresis.

41. The system of claim 40, wherein the boundary regions for system hysteresis comprise an upper margin delay line and a lower hysteresis delay line on a plot of critical path circuit delay over time for different voltages, and wherein the control signal is operable to adjust the voltage based on the upper margin delay line and the lower hysteresis delay line.

42. The system of claim 41, wherein the control signal is operable to raise the voltage to the processing core if the an added delay corresponding to the output of the multiplexer corresponds to a region above the margin delay line, and wherein the control signal is operable to lower the voltage to the processing core if the added delay corresponds to a region below the hysteresis delay line.

* * * * *

UNITED STATES PATENT AND TRADEMARK OFFICE
CERTIFICATE OF CORRECTION

| | | |
|---|---|---|
| PATENT NO. | : 7,437,580 B2 | Page 1 of 1 |
| APPLICATION NO. | : 10/840635 | |
| DATED | : October 14, 2008 | |
| INVENTOR(S) | : Eric L. Henderson, Michael Drop and Tauseef Kazi | |

It is certified that error appears in the above-identified patent and that said Letters Patent is hereby corrected as shown below:

Col. 7, claim 9, line 48, "if the an added delay", should be, --if the added delay--

Col. 8, claim 14, line 15, "if the an added delay", should be, --if the added delay--

Col. 9, claim 27, line 40, "sense and output signal", should be, --sense an output signal--

Col. 10, claim 32, line 22, "sense and output signal", should be, --sense an output signal--

Col. 11, claim 37, line 18, "if the an added delay", should read, --if the added delay--

Col. 12, claim 38, line 26, "sense and output signal", should be, --sense an output signal--

Col. 12, claim 42, line 27, "if the an added delay", should be, --if the added delay--

Signed and Sealed this

Twenty-ninth Day of December, 2009

David J. Kappos
*Director of the United States Patent and Trademark Office*